UNITED STATES PATENT OFFICE.

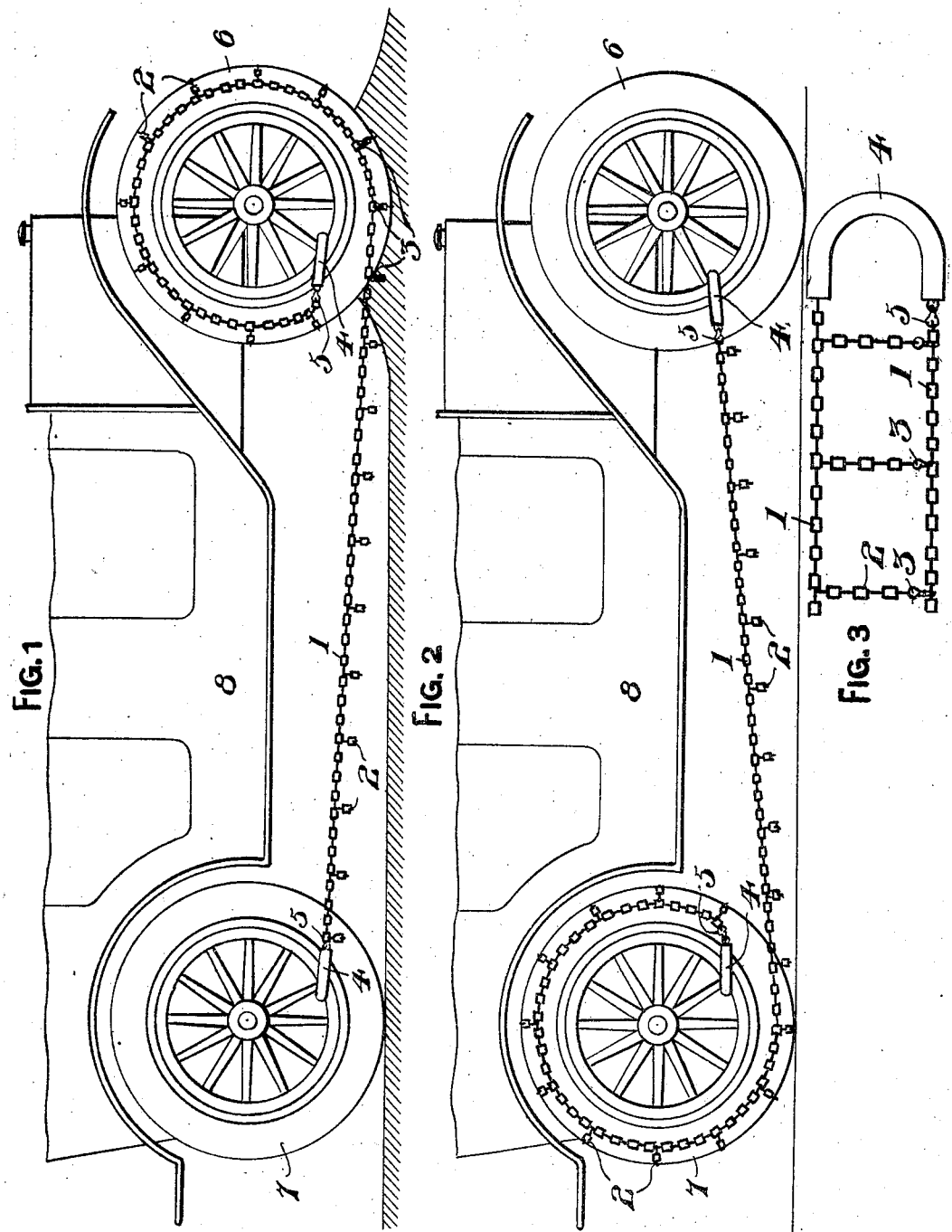

JOSEPH B. SMAY, JR., OF PITTSBURGH, PENNSYLVANIA, ASSIGNOR OF ONE-THIRD TO WILLIAM PHILIP SCHULTZ AND ONE-THIRD TO PETER J. W. HOAGLAND, BOTH OF PITTSBURGH, PENNSYLVANIA.

TRACTABLE MEANS FOR MOTOR-DRIVEN VEHICLES.

1,077,101.  Specification of Letters Patent.  Patented Oct. 28, 1913.

Application filed February 3, 1913. Serial No. 746,076.

*To all whom it may concern:*

Be it known that I, JOSEPH B. SMAY, Jr., a citizen of the United States of America, residing at Pittsburgh, in the county of Allegheny and State of Pennsylvania, have invented certain new and useful Improvements in Tractable Means for Motor-Driven Vehicles, of which the following is a specification, reference being had therein to the accompanying drawing.

This invention relates to tractable means for motor driven vehicles, and my invention aims to provide a device that can be easily and quickly placed in position upon the wheels of a motor vehicle for facilitating the removal of the wheels of the vehicle from a rut, crevice, fissure or hole in which it has accidentally entered.

It is a well known fact that when touring or even traversing streets that ruts and holes are often encountered and that in a great many instances the wheels of an automobile cannot be removed from a rut without resorting to contrivances or power other than that with which the automobile is equipped. It is generally necessary to resort to the use of planks or some other means in order to provide a footing or tread surface for the wheel to pass out of a rut. Such means is not always convenient, and for this reason I have devised what I have herein termed tractable means for motor driven vehicles that can be applied to the forward wheel of a vehicle and connected to a rear driven wheel of the vehicle, whereby when power is applied the rear wheel of the vehicle will revolve the forward wheel and cause the same to ride out of the rut. The device is in such form that the tire of the forward wheel can readily obtain a purchase upon the walls of the rut, and should the rut be of such length that one application of the device does not remove the wheel, the device can be readjusted for further operation and such operations carried on indefinitely until the automobile has been placed on solid ground.

My invention further aims to provide the above results by a mechanical construction that is simple, inexpensive to manufacture, applicable to various types of motor driven vehicles, and highly efficient as an appurtenance of an automobile kit.

The invention will be hereinafter specifically described and then claimed and reference will now be had to the drawing, wherein:—

Figure 1 is a side elevation of a portion of an automobile showing the device in position and ready for use, Fig. 2 is a similar view showing the device in the position it assumes after having accomplished its purpose, and Fig. 3 is an enlarged plan of a portion of the device.

Further describing my invention in detail with reference to the accompanying drawing wherein like numerals denote corresponding parts throughout:—1 denotes longitudinal parallel side chains connected by a plurality of equally spaced transverse tread chains 2 and the tread chains 2, adjacent to the ends of the side chains 1 are provided with snap hooks 3 for a purpose that will presently appear. The ends of the side chains 1 are provided with wheel yokes 4 preferably covered with rubber or some yieldable material for preventing the rim and spokes of a wheel from being injured. One of the side chains is permanently attached to the yokes 4 and the other side chain is detachably connected, as at 5 by a snap hook or other means, whereby the yokes 4 can be placed in engagement with the forward and rear wheels 6 and 7 of an automobile 8.

To place the device in use one of the yokes is connected to the rear driven wheel 7 of the automobile and the chains 1 and 2, arranged upon the periphery of the forward wheel 6, as shown in Fig. 1, with the other yoke held by said wheel. The snap hooks 3 permit of the chains 1 and 2 being arranged circumferentially of the forward wheel whereby the tread chains 2 will serve as anti-slipping means in connection with the wheel. Assuming that this wheel is in a rut and that power is applied, the device will be wound upon the driven wheel 7 and will impart movement to the forward wheel 6, whereby said wheel can readily climb out of the rut in which it is located. While the tractable means of the forward wheel 6 is released as the wheel is pulled out of a rut it is applied to the rear wheel 7 until the device has accomplished its purpose. It is then necessary to remove the device in order that the automobile can continue on its way, but should the rut be an extremely long one that the automobile has encountered, the device can be applied a number of times until the automobile is placed upon solid footing.

From the foregoing it will be observed that the device resembles an oblong anti-skidding means and that I utilize the same, through the medium of the power of the automobile, as a tractable means for removing the forward wheels of an automobile from ruts and impediments.

While I have herein used chains and yokes, it is to be understood that any other strong and durable flexible connections can be resorted to that can be wound and positioned circumferentially of a wheel, and further, in lieu of yokes any suitable means can be resorted to for attaching the ends of the device to the wheels whereby the rear wheels of the machine can be used for directly moving the front wheels thereof.

What I claim is:—

Tractable means for motor driven vehicles comprising flexible tread chains having the ends thereof detachably connected to the forward and rear wheels of the vehicle with the chains arranged upon the periphery of the forward wheel in a manner as to be unwound therefrom by the power of the rear wheels, said chains serving as tractable means in connection with said rear wheels during their use in connection with said forward wheels.

In testimony whereof I affix my signature in the presence of two witnesses.

JOSEPH B. SMAY, Jr.

Witnesses:
 MAX H. SROLOVITZ,
 KATHERINE ERRETT.